Dec. 20, 1966  F. SPIRK  3,293,464
ELECTRICAL MACHINE WITH VERTICAL SHAFT
Filed Sept. 21, 1964  2 Sheets-Sheet 1

Dec. 20, 1966 F. SPIRK 3,293,464
ELECTRICAL MACHINE WITH VERTICAL SHAFT
Filed Sept. 21, 1964 2 Sheets-Sheet 2

000
United States Patent Office 3,293,464
Patented Dec. 20, 1966

3,293,464
ELECTRICAL MACHINE WITH VERTICAL SHAFT
Franz Spirk, Berlin, Germany, assignor to Siemens-Schuckertwerke Aktiengesellschaft, Berlin-Siemensstadt and Erlangen, Germany, a corporation of Germany
Filed Sept. 21, 1964, Ser. No. 398,015
Claims priority, application Germany, Sept. 24, 1963,
S 87,465
11 Claims. (Cl. 310—89)

My invention relates to electrical machines with vertical shafts, and more particularly to electrical machines with vertical shafts that have a concrete housing.

The stators of electrical machines having vertically disposed shafts are generally constructed so that axially directed forces arising therein are absorbed by the foundation through the supports of the stator, whereas the housing annularly surrounding the stator only has to take up tangentially and radially directed forces. The forces that are primarily involved arise through heating caused by the magnetic flux or by torque during the operation of the machine. The housing which surrounds the stator of the machine is generally in the form of a concrete ring.

It is an object of my invention to anchor the core laminations of the stator by means of the simplest possible and most advantageous construction in a concrete ring in a manner superior to the known constructions of this general type.

With the foregoing and other hereinafter detailed objects in view and in accordance with my invention, I provide an electrical machine in which the packet of core laminations of the stator is formed as an all-inclusive unit and is supported in spaced relationship to the concrete ring by a plurality of struts. The struts are connected to the concrete ring and are able to transmit tangentially and radially directed forces. The anchoring of the laminate core packets is advantageous in that it consists of simple, standard components, manufactured by production-line methods, that are disposed in such a manner as to transmit the tangentially and radially directed forces. Furthermore, the struts maintain the unitary packet of core laminations of the stator in spaced relationship to the concrete ring so that the cooling air of the machine can flow in an axial direction and the rear side of the packet of core laminations is accessible over its entire length.

It is another feature of my invention to assemble the struts in the manner of a truss or framework. The anchoring of the stator core packet can thus be effected with small standard parts. It is a further feature of my invention to construct the struts with an adjustable length so that the lamination packet according to the arrangement of the laminations can be centrally oriented by the adjustment of the length of the struts.

Since the core lamination packet of an electrical machine becomes relatively greatly heated during operation and is accordingly greatly expanded, radially outwardly directed forces appear during the operation of the machine due to the thermal expansion of the core lamination packet, the forces being transmitted from the struts to the concrete ring. The concrete ring is contrarily barely heated by the operation of the machine so that it does not expand to the same extent as the core lamination packet. The radially outwardly directed forces transmitted to the concrete consequently produce tangentially directed tensile forces in the concrete which can be only relatively slightly absorbed by the concrete. It is therefore expedient to connect the struts to the concrete ring with links or joints that are elastic or flexible in the radial direction. The flexibility or resilience of these elastic links with respect to radially outwardly directed forces is of such selection that the core lamination packet is not prevented from expanding radially and the radial forces are not transmitted in their entirety to the concrete ring. No injurious tensile stresses are able to arise, therefore, in the concrete ring.

The packet of core laminations, furthermore, is subjected to radially inwardly directed forces which are produced by magnetic attraction. Since these forces are not often exactly symmetrical, the danger arises that the symmetry of the packet of laminations will become deformed and the packet will consequently lose its circular centrally aligned shape. It is therefore expedient to construct the connection of the struts to the concrete ring as rigidly as possible, in view of the radially inwardly directed forces so that the packet of laminations cannot change its original centrally aligned shape.

Other features which are considered as characteristic for the invention are set forth in the appended claims.

Although the invention has been illustrated and described as embodied in electrical machines of the vertical type, it is nevertheless not intended to be limited to the details shown since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
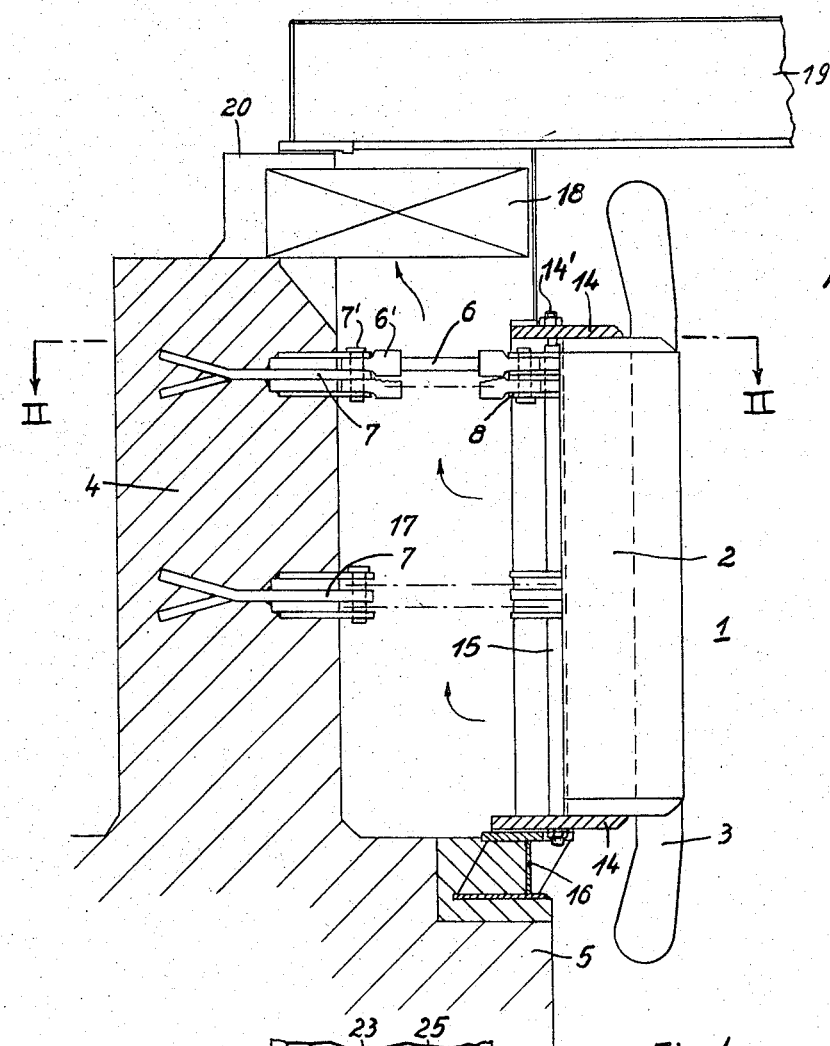
FIG. 1 is an axial cross section through a stator of an electrical machine having a vertical shaft and its associated supporting elements.
Figure 2:
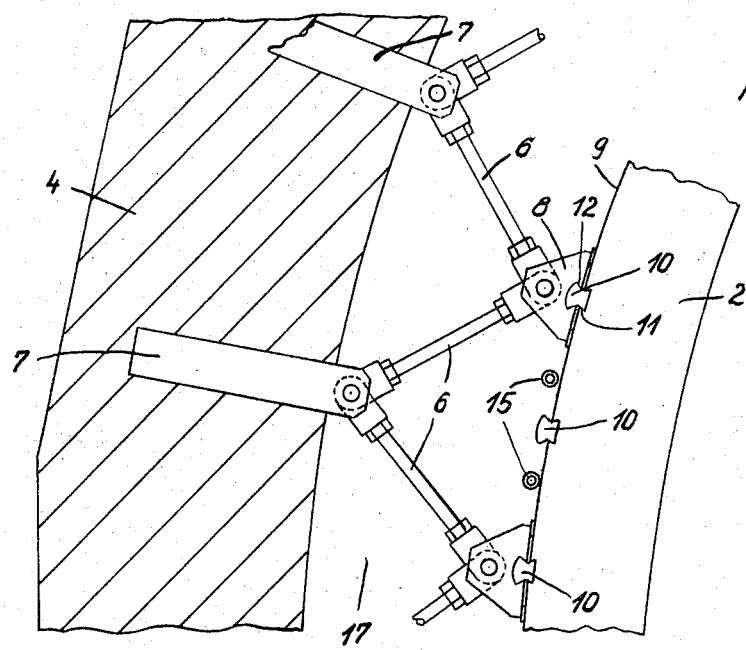
FIG. 2 is a fragment of a radial cross section of FIG. 1 taken along the line II—II in the direction of the arrows.

Referring now to the drawings, and particularly to FIG. 1 thereof, there is shown a stator 1 of an electrical machine which essentially comprises a self-contained packet 2 of substantially circular core laminations carrying a stator winding 3, and a portion of a concrete ring 4 which forms part of the foundation 5 of the machine. Tensioning bolts 6 serve as links or struts for connecting the packet 2 of core laminations to the concrete ring 4. The tensioning bolts 6 are connected on the one side with anchoring elements 7 that are encased in the concrete and are secured on the other side to gussets 8. The gussets 8 are of substantially triangular form with the largest side of the triangular shape facing the rear side 9 of the packet 2 of core laminations as shown more clearly in FIG. 2. The gusset plates 8 are fastened to the lamination packet 2 by means of double dovetail strips 10 which are disposed in corresponding dovetail grooves 11 in the packet 2 of laminations and similarly shaped grooves 12 in the gusset plates 8. In order to be able to better transmit, from the packet 2 of laminations to the gusset plates 8, the tangentially directed forces produced by torque, lateral wedges 13 are inserted between the rear side 9 of the packet 2 of laminations and the gusset plates 8, so that the walls of the grooves 12 engage the corresponding side walls of the double dovetail strips 10 without any play therebetween.

The double dovetail strips 10 serve not only for connecting the gusset plates 8 with the packet 2 of core laminations, but rather also for tensioning the packet 2 of laminations in the axial direction. The strips 10 are therefore connected with the compression flanges 14 (FIG. 1) of the packet 2 of laminations and are stressed. In order that the compression flanges 14 might exert the most uniform pressure possible on the packet 2 of laminations, there are additionally provided tubes 15 at the rear side 9 of the packet 2 of laminations between the double dovetail strips 10 and which are stressed with the compression flanges 14 but are, however, not connected with the packet 2 of laminations. The packet 2 of laminations is secured at its underside, that is with the lower compression flange 14 to the foundation ring 16 which is cast in concrete integral with the foundation 5 of the machine. Elongated bolts 14' passing through the tubes 15 and suitable apertures in the foundation ring 16 and the compression flanges 14 and tightened by respective nuts, provide tensioning means for securing the packet 2 between the flanges 14 and to the foundation ring 16.

By means of the tensioning bolts 6 which act as struts, the packet 2 of core laminations is spaced a relatively great distance from the concrete ring 4.

After passing through the packet 2 of laminations in the space 17 between the rear side 9 of the packet 2 of laminations and the concrete ring 4, the air employed for cooling the machine and which is circulated in a closed loop can thus be conducted in an axial direction and cooled by means of the cooler 18 provided above the space 17, and again recirculated to the machine. Due to this spacing, moreover, the rear side 9 of the packet 2 of core laminations is easily accessible over its entire length so that the control and maintenance of the machine is facilitated.

At its top, the machine is closed by an upper supporting spider 19 which is carried on extensions 20 of the concrete ring 4.

Figure 3:
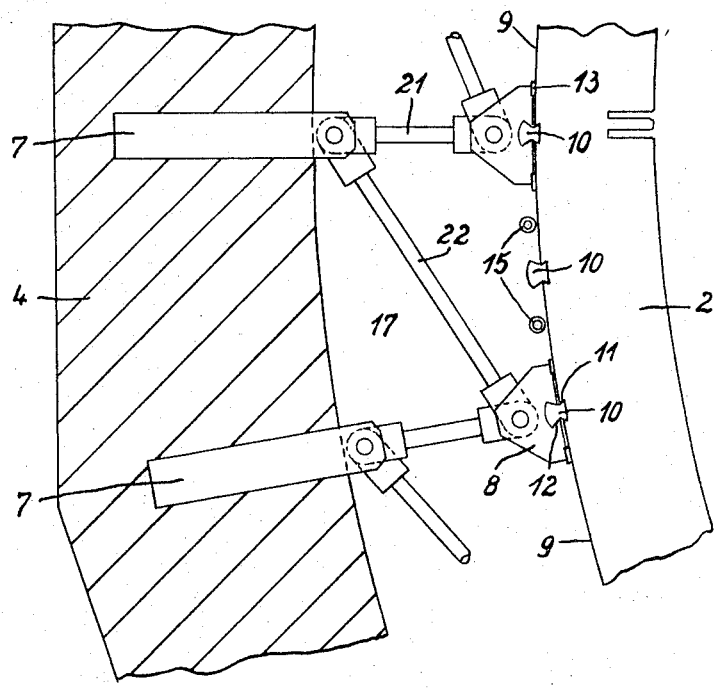
FIG. 3 is a variation of the embodiment shown in FIG. 2.

The struts or braces which anchor the packet 2 of core laminations and which are formed by the tensioning bolts 6, are assembled in framework fashion and are provided with bored end fittings 6' which are pinned with the pins 7' to the anchoring elements 7. In the embodiment of the invention shown in FIGS. 1 and 2, the tensioning bolts 6 are disposed at an angle of 45° with respect to the radius extending through their point of attachment. This structure is rigid and effective for transmitting tangentially or radially directed forces. However, for installing the machine, there is afforded a capability of varying the length of the tensioning bolts 6 for the purpose of centrally aligning or adjusting the packet 2 of core laminations. The structure of the struts or braces, as shown in the embodiment of FIG. 3, is particularly well suited for this purpose. As shown in FIG. 3, each of the anchoring elements 7 in the concrete ring 4 and the attachment gussets 8 at the rear side 9 of the packet 2 of core laminations are connected by a radially directed tensioning bolt 21 and a tensioning bolt 22 disposed at an angle of 45° to the tensioning bolt 21. For centering the packet 2 of core laminations, it is sufficient that an accurate adjustment be made of the length of the radially directed tensioning bolts 21, to which the length of the tensioning bolts 22 are accommodated according to the central alignment of the packet 2 of the core laminations. The length of the tensioning bolts 21, 22 can be varied, for example, by providing internally threaded end fittings 6' (FIG. 1) which can be threaded suitably only partly or fully on the threaded ends of the tensioning bolts, as desired.

Figure 4:
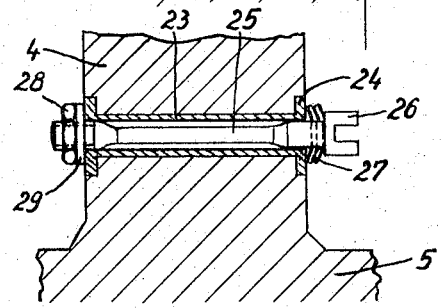
FIG. 4 is a fragmentary cross section of an electrical machine showing my elastic link for connecting the stator of the electrical machine to its surrounding concrete ring.

In electrical machines with vertical shafts generally, the anchored portions 7 are encased directly within the concrete ring 4 and, therefore, transmit all the tangentially and axially directed forces directly to the concrete ring 4. In accordance with a further feature of my invention, elastic links or joints are provided by me for connecting the struts or braces with the concrete ring. Such an elastic joint is shown in FIG. 4 and can be substituted for the conventional direct anchoring means 7 shown in FIG. 1. A tube 23 with end flanges 24 are encased in the concrete ring 4. A bolt 25 is disposed in the tube 23, and is provided with a head 26 suitably formed for securing the tensioning bolts 6 in a manner, for example, similar to that employed for the anchored portions 7 of FIG. 1, i.e. with a pin such as the pin 7' passing through the head 26 and through the apertured end fittings 6' of the tensioning bolts 6 disposed within the cut-out of the head 26. Since the bolt 25 must transmit tangentially directed forces to the tube 23 or the concrete ring 4, the diameter of the bolt 25 along the shank thereof is so selected that it is disposed with a little play within the bore of the tube 23. This diameter does not have to be maintained over the entire length of the bolt, however, so that, as illustrated in FIG. 4, it is shown necked down to a substantially smaller diameter along the middle of the bolt.

Between the head 26 and the flange 24 of the tube 23, several plate or leaf springs 27 are disposed on the shank of the bolt 25. The springs 27 have a spring characteristic which permits them to partly take up or absorb the radial expansion of the packet 2 of core laminations caused by heating and thereby reduce the forces to be transmitted to the concrete ring 4. A plate spring 29 having a different spring characteristic rendering its stiffer than the springs 27 is also disposed on the outwardly extending end of the bolt 25 under the nut 28 threaded on the end of the bolt 25 opposite the head 26. This plate spring 29 is pressed flat when installing the bolt 25 so that the bolt 25 is held practically rigid against radially inwardly directed forces. The plate spring 29 alone serves to prevent loosening of the bolt 25 when rather great thermal expansions take place.

The concrete ring 4, which forms the outer housing of the electrical machine, can be of pre-stressed or reenforced construction according to the mechanical properties that are afforded.

I claim:

1. Electrical machine of the vertical shaft type comprising a stator including a concrete supporting ring and a packet of core laminations disposed within said concrete supporting ring; a plurality of strut means connected between said concrete supporting ring and said packet of core laminations for maintaining said packet in spaced relation to said supporting ring, said strut means being adapted to transmit tangentially and radially directed forces from said packet of core laminations to said concrete supporting ring.

2. Electrical machine of the vertical shaft type comprising a stator including a concrete supporting ring and a packet of core laminations disposed within said concrete supporting ring; a plurality of bracing members in the form of a framework assembly connected between said concrete supporting ring and said packet of core laminations for maintaining said packet in spaced relation to said supporting ring, said bracing members being adapted to transmit tangentially and radially directed forces from said packet of core laminations to said concrete supporting ring.

3. Electrical machine according to claim 2 wherein said bracing members are adjustable lengthwise.

4. Electrical machine of the vertical shaft type comprising a stator including a concrete supporting ring and a packet of core laminations disposed within said concrete supporting ring; a plurality of bracing members in the form of a framework assembly connected between said concrete supporting ring and said packet of core laminations for maintaining said packet in spaced relation to said supporting ring; joint means for connecting said bracing members to said concrete ring, said joint means being resiliently yieldable in the radial direction; said bracing members being adapted to transmit tangentially and radially directed forces from said packet of core laminations to said concrete supporting ring, at least part of said tangentially and radially directed forces being taken up by said yieldable joint means.

5. Electrical machine according to claim 4 wherein said joint means is resiliently yieldable radially inwardly at a different spring characteristic than that at which it is radially outwardly yieldable.

6. Electrical machine of the vertical shaft type comprising a circular stator including a concrete supporting ring and a packet of superimposed substantially circular core laminations coaxially disposed within said concrete supporting ring; a plurality of anchoring elements secured to said concrete supporting ring, a plurality of tensioning bolts having end fittings respectively fastened to said packet of core laminations and said anchoring elements, said tensioning bolts holding said packet of core laminations in spaced relation to said supporting ring and being adapted to transmit tangentially and radially directed forces, arising during operation of the electrical machine, from said packet of core laminations to said concrete supporting ring.

7. Electrical machine according to claim 6 wherein said anchoring elements are spring-bolted to said concrete supporting ring.

8. Electrical machine according to claim 6 wherein said tensioning bolts extend radially between said packet of core laminations and said concrete supporting ring.

9. Electrical machine according to claim 8 including additional tensioning bolts having end fittings connected respectively with said radially extending tensioning bolts to said anchoring elements and to the points of connection of the respective adjacent tensioning bolts with said packet of core laminations.

10. Electrical machine according to claim 9 wherein the points of connection of said additional tensioning bolts and said radially extending tensioning bolts with said packet of core laminations are located in substantially triangular gusset plates secured to said packet of core laminations.

11. Electrical machine of the vertical shaft type comprising a circular stator including a concrete supporting ring and a packet of superimposed substantially circular core laminations coaxially disposed within said concrete supporting ring; plurality of anchoring elements secured to said concrete supporting ring, said anchoring elements comprising a bolt extending through a sleeve encased in said concrete supporting ring and formed with a head at one end, a nut tightly threaded on the other end of said bolt, and spring means disposed between said head and said concrete supporting ring on the one hand and between said nut and said concrete supporting ring on the other hand, a plurality of tensioning bolts having end fittings respectively fastened to said packet of core laminations and the heads of said anchoring elements, said tensioning bolts holding said packet of core laminations in spaced relation to said supporting ring and being adapted to transmit tangentially and radially directed forces, arising during operation of the electrical machine, from said packet of core laminations to said concrete supporting ring, at least part of said tangentially and radially directed forces being taken up by said anchoring elements.

References Cited by the Examiner

UNITED STATES PATENTS

| 2,320,843 | 6/1943 | Baudry | 310—258 |
| 2,424,299 | 7/1947 | Baudry et al. | 310—258 |
| 2,561,994 | 7/1951 | Rashevsky et al. | 310—258 |
| 3,023,329 | 2/1962 | Kamphaus et al. | 310—91 |

FOREIGN PATENTS

| 174,109 | 2/1953 | Austria. |
| 540,199 | 10/1941 | Great Britain. |
| 736,694 | 9/1955 | Great Britain. |
| 847,276 | 9/1960 | Great Britain. |
| 525,614 | 5/1955 | Italy. |

MILTON O. HIRSHFIELD, *Primary Examiner.*

ORIS L. RADER, *Examiner.*

D. F. DUGGAN, *Assistant Examiner.*